April 29, 1924.
G. JACOBS
1,492,374
PNEUMATIC WHEEL
Filed Oct. 25, 1922
2 Sheets-Sheet 1
Fig.1.
Fig.2.
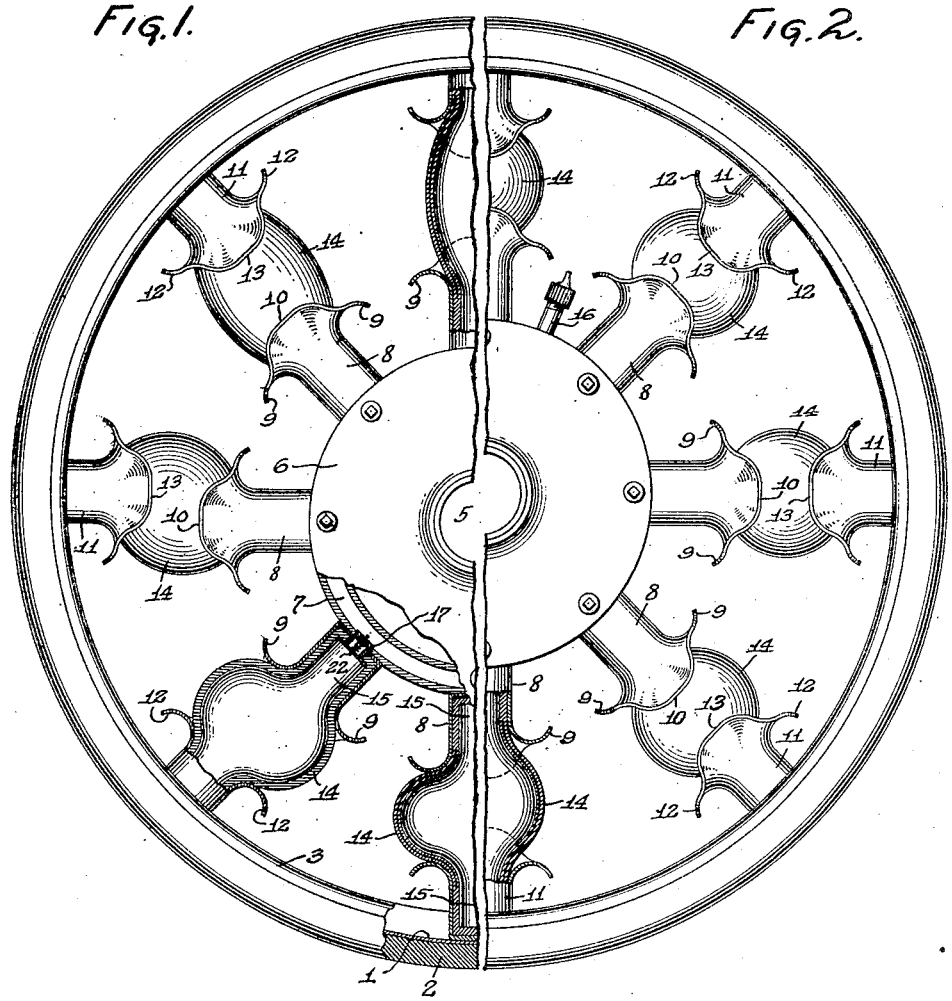
Inventor
George Jacobs,
By 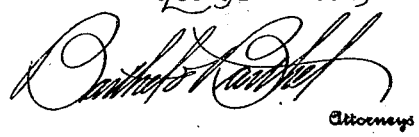
Attorneys April 29, 1924.
G. JACOBS
PNEUMATIC WHEEL
Filed Oct. 25, 1922
1,492,374
2 Sheets-Sheet 2
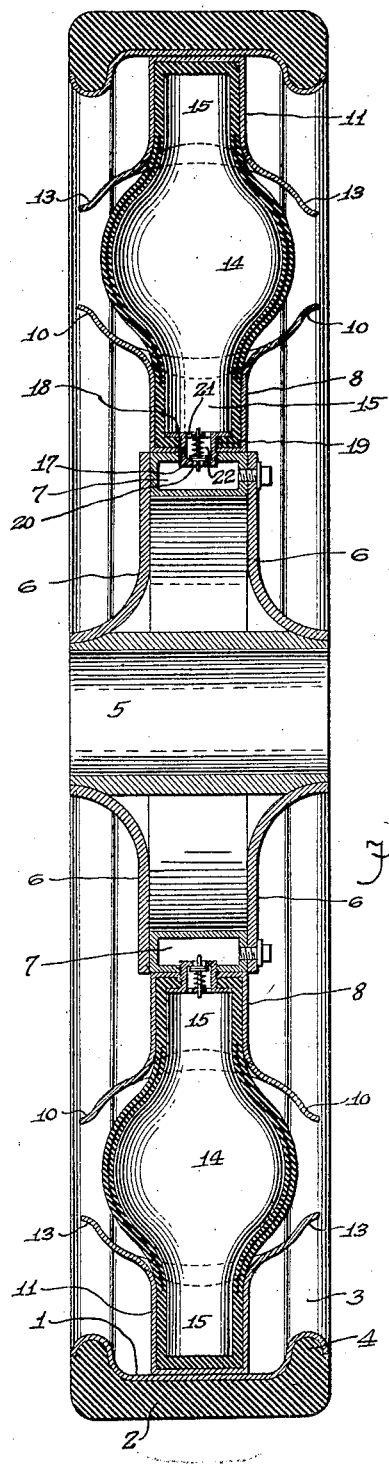
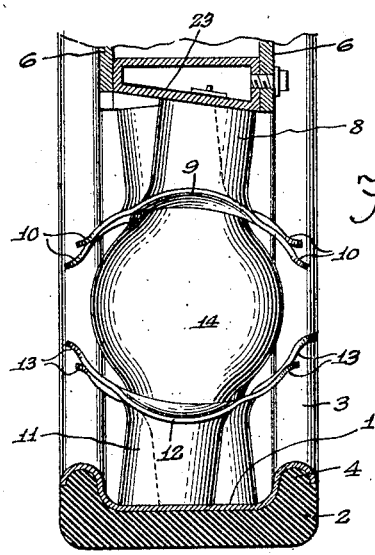
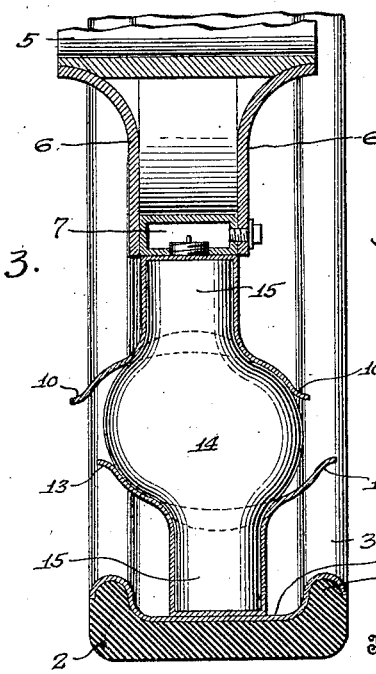
Inventor
George Jacobs,
By Barth & Hanket
Attorneys Patented Apr. 29, 1924.

1,492,374

UNITED STATES PATENT OFFICE.

GEORGE JACOBS, OF DETROIT, MICHIGAN.

PNEUMATIC WHEEL.

Application filed October 25, 1922. Serial No. 596,739.

*To all whom it may concern:*

Be it known that I, GEORGE JACOBS, a citizen of the United States of America, residing at Detroit, in the county of Wayne and State of Michigan, have invented certain new and useful Improvements in Pneumatic Wheels, of which the following is a specification, reference being had therein to the accompanying drawings.

This invention relates to pneumatic wheels and has special reference to that class of resilient wheels wherein resilient yieldable or pneumatic bodies are interposed between a hub and a rim, irrespective of the type of tire carried by the rim.

My invention aims to provide a wheel of the above class wherein hub and rim socket members cooperate in supporting pneumatic bodies which will permit of the hub and rim of the wheel shifting relative to each other either in the plane of rotation or laterally, without any danger of the pneumatic bodies becoming accidentally displaced or subjected to that degree of compression as to be injured or bruised.

My invention further aims to provide wheel spokes the greater part of which are pneumatic bodies protected to a great extent against stone bruise and other external injury and disposed for inflation from a common source of air to secure a uniform pressure in all of the pneumatic bodies about the hub of a wheel. Leakage from one body does not interfere with other bodies of the wheel and it is therefore possible to remove, repair or replace any pneumatic body of the wheel.

My invention further aims to provide pneumatic supporting members for a wheel hub which will compensate for side thrusts of the hub relative to the rim of the wheel, said members being self adjusting to sustain a hub and serve as shock absorbers to reduce to a minimum the vibrations of the hub when the periphery of the wheel encounters rough roads or irregular surfaces.

The construction entering into my invention will be hereinafter specifically described and then claimed, and reference will now be had to the drawings, wherein—

Figure 1 is a side elevation of one-half of a pneumatic wheel, as though subjected to a load;

Fig. 2 is a similar view of one-half of the wheel in normal condition;

Fig. 3 is an enlarged cross sectional view of the wheel;

Fig. 4 is a similar view of a portion of the wheel showing one of the pneumatic bodies or hub supporting members as though subjected to a side thrust by the hub of a wheel, and Fig. 5 is a similar view illustrating hub supporting members disposed to resist or compensate for side or lateral movement of the wheel hub.

In the drawings, the reference numeral 1 denotes a rim provided with a tire 2 and in this particular instance the rim 1 is formed with circumferential side channels 3 into which may be fitted side edges or beads 4 of the tire 2, said tire being preferably made of rubber or a resilient material.

Concentric of the rim 1 and yieldably supported therein is a hub which I have illustrated as being composed of a sleeve member 5, side members 6 and a hollow filler member or air reservoir 7. These hub members are suitably secured together and in lieu thereof I may use various types of hubs and provide the same with air reservoirs, an air conduit or channel, or other means of distributing air under pressure about the periphery of the hub.

Mounted on the hollow filler member or air reservoir 7 and secured thereto by welding or other fastening means are radially disposed and equally spaced tubular socket members 8 having the outer ends thereof flanged, flared or otherwise shaped to afford opposed circumferentially disposed lips 9 and opposed transversely disposed flanges 10.

Welded or otherwise attached to the inner wall of the rim 1 are tubular socket members 11 corresponding in number to the socket members 8 and the socket members 11 are formed with lips 12 and flanges 13 similar to the socket members 8.

The socket members 8 and 11 are normally in opposed radial relation and interposed between said socket members and extending therein are pneumatic bodies or hub supporting members 14, each member being substantially globular in elevation with diametrically opposed cylindrical necks 15 fitting in the tubular socket members 8 and 11. Each pneumatic body 14 is preferably made of vulcanized rubber suitably reinforced and said pneumatic bodies are adapted to be inflated from the air reservoir 7 of the wheel hub, which reservoir has an air filling connection 16 of conventional form permitting of air being stored in the reservoir 7 or pumped into said reservoir and distributed to the pneumatic bodies 14. For this purpose the inner necks or ends 15 of the pneumatic bodies 14 are provided with valve bodies 17 screwed or otherwise mounted in the outer annular wall of the reservoir 7, said valve bodies having flanged outer ends 18 engaging the end walls 19 of the inner necks 15 and anchoring the inner necks within the socket members 8. The valve bodies 17 are adapted to establish communication between the air reservoir 7 and the pneumatic bodies 14 by openings 20 in the inner ends of said valve bodies and openings 21 in the outer ends thereof. In said valve bodies are spring pressed check valves 22 normally closing the openings 20, said check valves opening inwardly within the valve body 17 when the pressure of air within the reservoir 7 exceeds the pressure of the springs holding said check valves seated or closed. When air under pressure is placed in the reservoir 7 the check valves can be unseated to permit of all the pneumatic bodies 14 being simultaneously inflated and the inflation of such bodies frictionally binds the necks 15 within the socket members 8 and 11.

Assuming that the wheel hub is subjected to a load the uppermost pneumatic bodies will be elongated as brought out in Fig. 1, and the lowermost pneumatic bodies will be subjected to compression which causes said bodies to be distended and to overlie the lips 9 of the socket members 8 and 11. Direct vertical pressure on the lowermost pneumatic body will cause all of the lips of the opposed socket members to cooperate in supporting distended portions of the pneumatic body and of course, the body will somewhat overlie the lateral flanges 10 and 13 of the socket members. The adjacent pneumatic bodies will overlie diagonally disposed lips of the socket members 8 and 11, that is, those lips which are more or less one above the other or in vertical planes. With the wheel rotating there is a constant and varied distortion of the pneumatic bodies and a plurality of these bodies at all times supports the load on the hub of the wheel.

When there is side thrust or lateral shifting of the hub relative to the rim, as illustrated in Fig. 4, the flanges 10 and 13 of the socket members 8 and 11 are brought into action, said flanges having a curvature affording seats for the walls of the pneumatic body, and in all instances the flanges and lips have a configuration precluding any injury to the pneumatic bodies that may result from sharp edges or abrupt curves.

As illustrated in Fig. 5 I may place sets of the socket members 8 and 11 so as to intersect the plane of rotation of the wheel and in this manner have approximately half of the socket members and pneumatic bodies cooperating in resisting side thrust in one direction and the other half of the socket members and pneumatic bodies resist side thrust in the opposite direction. To accomplish this the socket members 11 of the rim 1 are set at an angle relative to said rim and the outer wall of the air reservoir 7 may be provided with seats 23 to support the socket members 8 normally co-axial of the angularly disposed socket members 11. In other words, the socket members of each set will be in opposed relation with alternating sets in a plane at an angle to the plane of the remaining set. Such an arrangement will afford a greater resistance to side thrust or lateral swing of the hub relative to the rim than if the pneumatic bodies were disposed in a plane at a right angle to the direction of side thrust.

While in the drawings there are illustrated the preferred embodiments of my invention, it is to be understood that the structural elements are susceptible to such variations and modifications as fall within the scope of the appended claims.

What I claim is:—

1. In a pneumatic wheel wherein a hub is supported within a rim, pneumatic hub supporting means;—said means comprising hub socket members, rim socket members, pneumatic members mounted between and in the hub and rim socket members, and a common means of simultaneously inflating said pneumatic members.

2. A pneumatic wheel as called for in claim 1, wherein said pneumatic members are in the form of globular bodies having necks extending into the hub and rim socket members.

3. A pneumatic wheel as called for in claim 1, wherein said socket members have laterally extending flanges brought into engagement with said pneumatic members when said hub is shifted laterally relative to the wheel rim.

4. A spoke for a vehicle wheel, comprising coaxial tubular socket members, a pneumatic body having tubular necks mounted in said tubular socket members and a check valve axially of said pneumatic body adapted to permit of said pneumatic body being inflated.

5. A wheel spoke as called for in claim 4, wherein said socket members are provided with lips and flanges, the lips cooperating in supporting said pneumatic body during radial compression thereof and the flanges cooperating in supporting the pneumatic body when one of said socket members receives a side thrust relative to the other socket member.

In testimony whereof I affix my signature in presence of two witnesses.

GEORGE JACOBS.

Witnesses:
 KARL H. BUTLER,
 CHARLES W. STAUFFIGER.